358-84. XR 3,305,836 SR CROSS REFERENCE SEARCH

Feb. 21, 1967 C. C. BUCKLE ET AL 3,305,836
SUBSCRIPTION TELEVISION, RADIO AND
LIKE INFORMATION SUPPLY SYSTEMS
Filed June 3, 1963

TXS
R

INVENTORS
CYRIL CHARLES BUCKLE
DENIS W. HEIGHTMAN
BY Irwin S. Thompson
ATTORNEY

United States Patent Office 3,305,83

Patented Feb. 21, 196

3,305,836

SUBSCRIPTION TELEVISION, RADIO AND LIKE INFORMATION SUPPLY SYSTEMS

Cyril C. Buckle, Stanmore, and Denis William Heightman, Elstree, England, assignors to British Home Entertainment Limited, London, England, a British company Filed June 3, 1963, Ser. No. 285,082
Claims priority, application Great Britain, June 8, 1962, 22,298/62
13 Claims. (Cl. 340—147)

This invention relates to systems for the supply, on a subscription basis, of electric signals conveying television or radio programmes or other information and is more particularly concerned with improved arrangements for registering acceptance of signals by a subscriber and for assessing and/or collecting the fees due from such subscriber.

A prerequisite for successful commercial operation of systems of the above kind is that the equipment provided at each subscriber's premises shall be relatively simple, reliable and of low cost. For operation on a credit basis, such requirements can be met by arranging for the signalling back to a common collection point by each subscriber of his acceptance of any particular programme or equivalent group of signals. The major problem then is that of identifying each individual subscriber.

Such signalling back to a common point of the acceptance of a particular programme by a subscriber is also useful when the system is being operated upon a prepayment basis for providing a check upon the proper operation of the repayment arrangements at the subscriber's premises while it additionally affords, under both credit and prepayment systems of operation, a means for assessing at the time of distribution, the total number of subscribers who are currently accepting the programme.

It is one object of the invention to provide improved arrangements, adaptable for either credit or prepayment operation, for effecting recording or registering of the acceptance of distributed programme or similar signals by each of a number of different subscribers supplied by way of a common distribution channel while another object is to provide means for effecting, when desired, a local record at each subscriber's premises of the programmes which have been accepted during a preceding period of time.

According to one feature of the invention each subscriber is provided with a cyclically operating timing device which is arranged to be started on each operation cycle by each of a series of reference signals transmitted with the programme signals being offered. Each timing device is then arranged to control the emission of an acceptance signal after a time interval which is different for each of the subscribers, such acceptance signal being returned to a collection point common to the group of subscribers, possibly by way of the programme signal distribution network if this is of the cable type or, alternatively, by some other available route such as a telephone line or a special signal cable laid with the distribution cable. At the common point the acceptance of the supplied signals by any subscriber is indicated by the receipt of the returned signal and the subscriber is identified by the timing of such returned signal relative to the preceding reference signal.

In order that the above and other features, objects and advantages of the invention may be more readily understood a number of embodiments thereof will now be described by way of illustrative example and with reference to the accompanying drawings in which.

Figure 1:
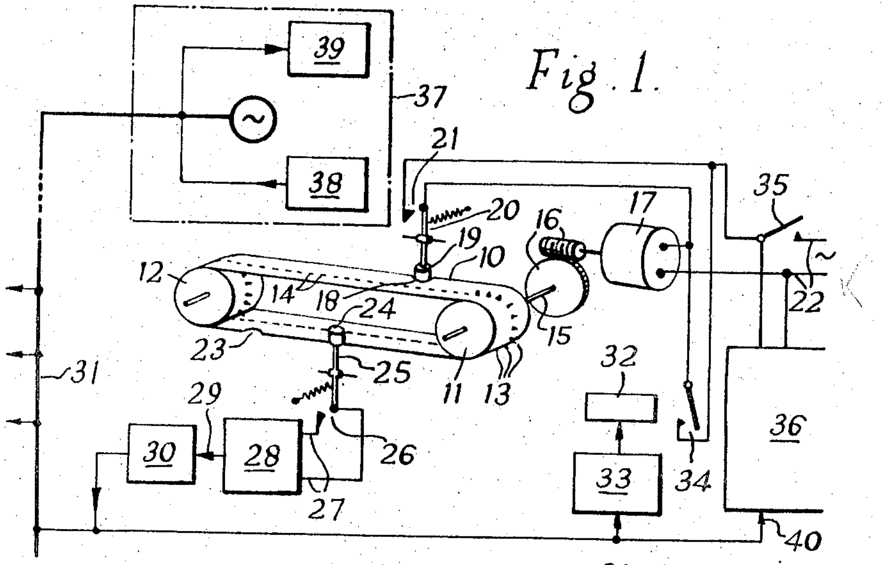
FIGURE 1 is a schematic diagram of one arrangement embodying a cyclically operating timing device at each subscriber's premises in a television or like signal distribution system and adapted, more particularly, for operation on a credit supply basis.

Referring first to FIG. 1 of the drawings which show one form of subscriber's timing device, 10 denotes a endless loop of tape-form material of suitable flexibl and durable character, for instance, P.V.C. or other plastics substance. This loop extends around two spaced apart drums 11, 12 at least one of which, that shown a 11, is provided with projecting teeth or pins for co-operation with perforations 14 in the tape 10 in order to maintain a positive driving connection between the tape an said drum. The respective drums 11, 12 are suitabl journalled in a fixed supporting framework, not shown while the drum 11 is secured to a spindle 15 which i coupled by way of a suitable speed change gearing 1 to the drive shaft of a small self-starting synchronou electric motor 17.

One side edge of the tape 10 is provided with a control marking in the form of a notch 18 at a chosen position. Such notch is arranged to cooperate with a sensin roller 19 on one end of a pivotal switch lever 20 which i biased by spring or other means to maintain the rolle 19 in contact with the tape edge. The switch lever controls the opening and closing of switch contacts 21 in suc manner that the contacts are open when the roller 19 i resting in the notch 18 and are closed when the notch i displaced from the roller so that the latter rests upon th normal side edge of the tape. The switch contacts 21 ar connected in series with the motor 17 across the suppl leads 22 from a suitable source of alternating curren for instance, the normal public supply mains.

The opposite side edge of the tape 10 is provided wit a second control marking in the form of another notc 23 located at a position relative to the notch 18 as wil be explained later. This notch 23 is arranged to co-operate with a further sensing roller 24 on one end of a second pivotal switch lever 25 which is also biased by sprin or other means to maintain the sensing roller in contac with the tape edge. This switch lever 25 controls th opening and closing of contacts 26 in such manner tha the contacts are closed when the roller 24 is located i the notch 23 and are opened when the notch is displace from the roller. The contacts 26 are connected ove leads 27 to control the operation of acceptance signa generating means 28, conveniently in the form of a audio or other frequency electric oscillation generato whose signal output on lead 29, available only when th contacts 26 are closed, is fed through an isolating networ 30 to the distribution network 31 by which the televisio or other signals are supplied from a central distributio station 37 to the subscriber and to the remainder of th group of similar subscribers connected in parallel to th network.

A relay 32 has its operating winding connected by wa of reference signal separating means 33 to the same distribution network 31. The characteristics of the mean 33 are such that the relay winding is energised only upo the presence in the distribution network of signals of th particular character chosen to identify the aforementione reference signals. Such signals may be supplied at th chosen intervals by generating means 38 convenientl but not necessarily, located at the distribution station 3 The relay contacts 34, which are normally opened an closed only when the relay is operated, are arranged in shunt across the contacts 21 controlling energisation of the motor 17.

The two switch levers 20 and 25 are mounted at fixed positions on the support frame and the respective notches 18 and 23 are so placed relative to one another that the switch lever 25 will be operated by arrival of the notch 23 opposite the sensing roller 24 after the lapse of a predetermined interval of time from the instant when the switch lever 20 is operated to open contacts 21 by movement of the notch 18 away from the sensing roller 19. Such predetermined time interval is made of different value for each of the plurality of separate subscribers connected to the common distribution network 31.

The manner of operation of this arrangement is as follows. The normal quiescent condition is that shown with contacts 21 open and with relay 32 not operated whereby the motor 17 and tape 10 are both stationary. Upon the arrival over the distribution network 31 of a reference signal from the generator 38 this passes the signal separating means 33 and the relay 32 is operated to close the contacts 34. Power is accordingly made available to the motor 17 which starts to rotate the drum 11 and thus to drive the tape 10 forwardly. Such movement of the tape displaces the sensing roller 19 from the notch 18 whereby the contacts 21 are closed and the power supply to the motor 17 is maintained even when the initial reference signal over the network 31 ceases and relay 32 releases. The motor 17 continues to rotate and so to drive the tape loop 10 forwardly at a chosen constant speed until the notch 18 is again presented to the sensing roller 19 at the end of one complete circuit by the tape. This marks the end of the operation cycle of the device.

During such operation cycle, at a time instant determined by the positioning of the notch 23, the switch lever 25 is operated to close contacts 26 thereby to cause operation of the generator 28 to emit the chosen acceptance signal. This acceptance signal is transmitted by way of the network 31 to operate recording or register means 39 which are again conveniently, but not necessarily located at the distribution station 37. Such register means may comprise a magnetic tape recorder arranged also to record each transmitted reference signal as a datum or marker. Such acceptance signal by its particular delay time subsequent to the transmission of the related reference signal provides identification of the particular subscriber's premises at which the operative apparatus is located. It is, of course, arranged that operation of the arrangement is possible only when the subscriber's receiving apparatus 36 is actually in use. This may conveniently be effected by the inclusion in the power supply leads 22 of a switch 35 interconnected with or forming part of the usual control switch of the subscriber's apparatus. The latter is also supplied in the usual way at input 40 with the television or other signals from the network 31.

In an arrangement as described the isolating network 30 may be of any convenient and known form suitable to prevent or reduce loss of the normal distributed signals within the generator 28. Thus if the reference signals have the form of a modulated pulse, the means 30 may comprise a suitable filter network. In similar manner the form of the generator 28 and its manner of control may follow already well known principles, and will be determined by the chosen form of the acceptance signal. To limit power requirements and to simplify the keying control by the switch contacts 26, the acceptance signal generator 28 is conveniently one embodying transistors or, alternatively, in the case where the acceptance signal is characterised by an oscillation component at a particular frequency, it may take the form of a tone generator device comprising a rotating disc driven by the motor 17 and provided in known manner with one or more light modulating tracks which serve to control the passage of light between a suitable source such as a small electric lamp and a photoelectric device such as a photocell or phototransistor. Such tone generator form of device is of convenience, as will be described later, when a choice among different frequencies is required for signalling acceptance by the subscriber.

The form of the reference signal separating means 33 will depend upon the character of the reference signals employed. Thus if such signals are identified by the presence of an oscillation component of a particular frequency, the means 33 may comprise a suitable filter network, whereas if such signals are in the form of pulses of a particular time duration the means 33 will include a pulse separating circuit adapted to test the duration time of applied pulse signals and to provide a responsive output only for the particular chosen duration of pulse. Circuit arrangements of both types are already well known.

Various modifications are clearly possible. For example instead of using notches, the control markings may be in the form of perforations in the body of the tape 10 or in the form of projections mounted thereon. Instead of employing a mechanical form of control marking, control may be effected by means of magnetic or optical markings on the tape loop in association with appropriate sensing means while instead of employing a flexible loop as described, use may clearly be made of other types of cyclic mechanisms such as cam discs.

The form and dimension of the control member, such as the tape loop 10, is determined to some degree by the number of different subscribers on any one network or network branch and, since identification of each subscriber is dependent upon the measured time delay between transmission of a reference signal and the reception of the related acceptance signal, a large number of subscribers will demand considerable positional accuracy of the respective notches 18 and 23 and of the synchronous driving motion imparted to each of the different tape loops unless the time taken for each operation cycle of the timing device is made very long.

In order to allow for slight timing inaccuracies among the plurality of timing devices of a large number of separate subscribers it is preferable, in accordance with another feature of this invention, to arrange for the transmission from the common supply point of a series of spaced timing signals following each reference signal. These timing signals, which are of a form suitably different from the reference signal to permit easy separation by simple circuitry, each serve to control one input of a coincidence gate circuit whose other control input is supplied with the signal from the subscriber's timing device previously used to initiate the generation of the acceptance signal, the gate circuit output now serving to control the acceptance signal generating means.

The precise timing of each acceptance signal is then determined by the timing signals of the outgoing control signal rather than by the physical characteristics of the delay loop mechanism and sensing means in the subscribers equipment, it being understood that variations caused by these factors must not exceed the tolerance allowed by the chosen pulse duration and the interval between successive pulses. This standardisation of the acceptance pulse timings facilitates the handling of the received data and allows for the possibility of interleaving other information pulses in the same transmission channel.

Figure 2:
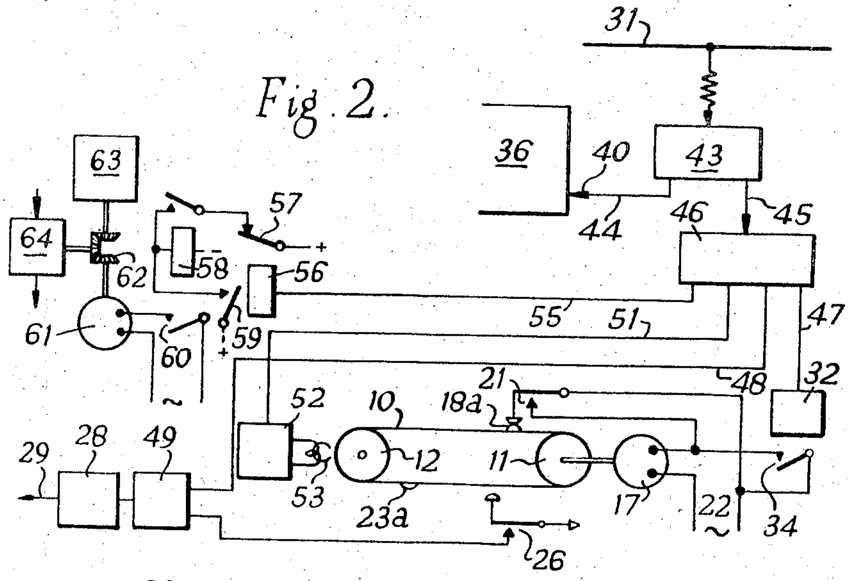
FIGURE 2 is a schematic diagram of another an more elaborate arrangement including means for making a local record of those programmes which are accepted by the subscriber and showing further means b which the system may be adapted for operation on prepayment basis.

One arrangement of this modified form is shown in FIG. 2 in which the tape loop 10 is shown provided with projections 18*a* and 23*a* instead of notches as in the previous embodiment, such projections operating the control switch contacts 21 and 26 as before. In this arrangement the signals on the distribution network 31 are fed to each subscriber through a signal filter circuit 43 which serves to separate the television or other distributed signals from the related control signals. For convenience of explanation it will be assumed that such control signals are in the form of pulses having suitably different characteristics identifying respectively their different functional purposes.

The television or other supplied signals are available on output lead 44 and are fed to the subscriber's apparatus 36 while the various control signals are supplied on lead 45 and are then applied to a pulse separator circuit 46 of suitable form adapted to segregate the reference signals on to output lead 47 and to segregate the further timing signals which are radiated subsequent to each reference signal on to the output lead 48. The reference signals on lead 47 are arranged to operate the relay 32 as in the first embodiment but the switch contacts 26 instead of controlling the operation of the acceptance signal generator 28 directly, are arranged, when close, to supply a gate opening voltage to one control input of a coincidence gate circuit 49 the other control input to which is supplied with the series of timing signals available on the output lead 48 from the pulse separator circuit.

In this modified arrangement, the switch contacts 26 are closed a little before the actual time delay instant which will mark or identify the particular subscriber and open again a little after such time instant. Precisely at such time instant there will be a timing signal available on the output lead 48 and this, on application to the gate circuit 49, in coincidence with the already present control signal from the switch contacts 26, will provide an output from the gate circuit to initiate operation of the acceptance signal generator means 28.

Such timing signals may also be used at the common collection point, e.g., the distribution station 37, to control gating means for directing any received acceptance signals into the metering or recording channel individual to each subscriber. Alternatively, all of the received acceptance signals can be recorded, e.g. on a multi-track magnetic tape, along with the control and timing signals for subsequent analysis and account computation. The central point equipment may also include digital counting apparatus stepped forward by each received acceptance signal and reset by each transmitted reference pulse for providing a continuous indication of subscribers active at any time.

The control signals are preferably of pulse form, the reference and timing pulses being of suitably different length to permit easy separation. Alternatively, such reference and timing pulses may be modulated at different frequencies. The loop circulation time is conveniently of the order of one or several minutes depending upon the number of subscribers being dealt with as a group at the common collection point. Such group number may be several hundred. The number of reference signals (and their following groups of timing signals) is determined by the intervals at which it is desired to register each subscriber's acceptance and therefrom to levy a charge. Such intervals may vary in accordance with the nature of the programme or other information being supplied.

In some circumstances it is desirable to obtain a local physical record of the subscriber's acceptances at his premises for collection at periodic intervals and usable as a check against the common collection point register. This requirement may be met, in accordance with another feature of this invention, by using the timing loop of the arrangements already described as a carrier for a recording medium such as a continuous magnetic stripe disposed along the length of the loop. A suitable marking, e.g. a magnetic recording of a single pulse, is then made for each accepted programme; the various marking positions along the length of the loop serving to identify the different programmes during the period between installation and removal of the loop. In one arrangement of this kind, a particular one of the series of timing signals, different for each programme, is further modified in form to permit its selection by the subscriber's equipment to provide a signal which serves to operate the marking or recording means.

FIG. 2 also illustrates the additional apparatus needed for effecting such recordings at the subscriber's premises. In this arrangement, the pulse separator circuit 46 includes further means for providing on an additional output lea 51 a signal which is indicative of the arrival from th distribution network 31 of the particular, modified, timin signal which is to be used for programme identification Such lead 51 is connected to means 52, such as an amplifier or record signal generator, for providing a signa output to a magnetic recording head 53 held in fixed position opposite the magnetic record track or stripe provide along the length of the loop 10.

Upon arrival of each, special form, timing signal, corresponding marking will be made on the record loo 10 at a position, measured from a datum point governe by the stop/release marking 18a, which is dependent upo the timing of the special form signal relative to the preceding reference signal and which, since it is unique to on particular programme, can be used subsequently to establish acceptance of that programme by the subscriber concerned. Normally a considerable number of referenc signals, with accompanying operation cycles of the subscriber's equipment, will occur during the course of complete programme but as the successive special forn timing signals used for programme identification will al have the same delay time, the effect at the subscriber' apparatus will merely be multiple recording of the specia signal at the same spot on the tape loop. The numbe of marking positions is clearly equal to the number of timing signals available and capable of being separately recorded and may be several hundred.

The arrangements so far described are primarily intended for operation on a credit basis although also o use for statistical or checking purposes with both credi and prepayment systems of operation. If operation o a prepayment basis is required, the arrangements described may, in accordance with yet another feature o the invention, be modified in order to permit control o the rate of credit reduction by the prepayment mechanism.

The conventional means for prepayment supply comprise a switch operated between its on and off position by mechanism differentially controlled by two movement one towards the switch on position brought about b coin insertion in coin registering means available to th subscriber, and the other towards the switch off positio brought about by clock timing means such as a synchronous electric motor energised while the subscriber' apparatus is in use.

In accordance with such further feature of the invention, the aforesaid clock timing means is arranged to b operable intermittently instead of continuously for period whose length is determined and controlled from the programme supply point. This control is conveniently effected, in a manner analogous to that described abov for local recording of accepted programmes, by furthe modifying a chosen one of the timing signals to perm its selection in each operative subscriber's equipment fo use in terminating a period of energisation or operatio of the clock timing means which was previously commenced upon the reception of the preceding referenc signal. By suitable choice of the modified clock-contro timing signal from among the series of timing signa available, the period of operation of the clock timin means and hence the average rate of credit reduction ma be varied over a wide range.

FIG. 2 also illustrates one apparatus arrangement fo operating on a prepayment basis utilizing the abov scheme. The pulse separator circuit 46 includes furth circuit means such as filter means or pulse width select means for segregating those of the timing pulses whic are modified to constitute clock-control signals. Suc isolated clock-control signals are made available on output lead 55 and are applied to operate a further relay 5 having contacts 57 in the lock-in circuit of a relay 5 connected for primary operation by an additional set o contacts 59 of the relay 32 operated by each referen signal. The relay 58 has its main contacts 60 in seri with the power supply to a second synchronous motor 61 coupled to one side of a differential gear 62 the opposite side of which gear is coupled to the credit spindle of coin registering mechanism 63. The planetary member of the differential gear 62 is coupled to cam or similar means controlling the position of an on-off switch mechanism 64 which is in series with the subscriber's apparatus control switch.

With such an arrangement, each arriving reference signal, in addition to initiating a new cycle of the control loop 10 by operation of relay 32 also causes operation of relay 58 which locks in over the normally-closed contacts 57 of relay 56. In consequence of the closure of contacts 60, the motor 61 starts to drive the switch mechanism 64 in the direction to open the switch contacts. The prepayment coin mechanism, at each coin insertion, causes movement of the switch mechanism 64 in the opposite sense to close or maintain closed the switch contacts. Operation of the motor 61 to reduce any established credit continues until the arrival of the subsequent clock-control signal causes momentary energisation of relay 56 thereby opening the lock-in circuit of the relay 58 at contacts 57. The motor 61 is then deenergised by opening of contacts 60 and remains so until the next operation cycle is started by the arrival of the next reference signal. By altering the time of the clock control signals relative to the preceding reference signals, the periods of energisation of the motor 61 can be varied in length with consequent alteration of the levied charge.

In an alternative system for the same purpose, a succession of the timing signals may be of the special altered form chosen to identify them as clock control signals or a further group of such different form clock control signals may be transmitted before or after the timing signals specifically for such clock timing control purposes.

Figure 3:
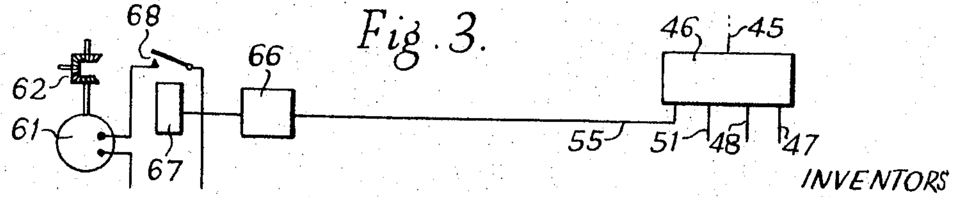
FIGURE 3 is a fragmentary diagram illustrating modification of the arrangments shown in FIG. 2.

FIG. 3 illustrates one manner of modifying the arrangements of FIG. 2 for operation with this system. The signal output on lead 55 from the pulse separator circuit 46 is fed through suitable integrating circuit means 66 to the operating coil of a relay 67 whose contacts 68 control the supply of current from the supply leads 22 to the motor 61. The motor 61 is energised to reduce the credit condition of the prepayment mechanism for a period during each operation cycle of the device corresponding to the time during which the special clock control signals are present on the network 31.

The number of subscribers capable of being dealt with in the same group with a given length of the cycle or scan time of a timer loop of chosen length may be increased, in accordance with yet a further feature of the invention, by imposing further modulation at convenient frequencies, e.g. within the range of 40 kc./s. to 100 kc./s., upon the timing pulses; two or more successive pulses modulated each at different frequencies may then be transmitted within the time period previously assigned to one timing pulse. Each of the subscriber's equipments includes additional frequency selective circuitry appropriate to the different frequency assigned to that subscriber.

Thus, in an arrangement as already described in connection with FIG. 2 or FIG. 3, the pulse separator circuit 46 would include within the arrangements providing an output on lead 48, frequency selective means such as a filter network appropriate to that one of the two or more modulation frequencies superimposed on each timing signal assigned to the subscriber concerned whereby an output is provided on such lead only during that part of each timing signal when the particular modulation frequency is present. The gate 49 is accordingly opened to allow generation of an acceptance pulse during a correspondingly restricted time period. Such an interlacing arrangement provides an effective timing signal repetition rate which is two or more times that which is possible within the range of timing tolerance allowable by the loop markings. When the distribution network is carrying two or more different television or similar programme signals each of which are subject to payment for their supply, the acceptance signal generator means 28 may be arranged to provide a corresponding number of different and separately identifiable output signals, for example, signals at different frequencies. Selection of which signal is to be employed is controlled by switch means interconnected with the programme selection switch of the subscriber's apparatus so that the central recording point can, by examination of the frequency of the acceptance signal as well as its timing, determine not only which subscriber is active but also which programme is being taken. The tone generator employing a motor driven disc already referred to is particularly convenient for this purpose.

For use under prepayment conditions with such multiple signal supply, two or more separate sets of clock timing control signals each of different form or character, may be provided subsequent to each reference signal with timings related respectively to the corrseponding charge rates to be levied. The pulse separator circuits 46 then include alternative selection circuit means, selected by switch means linked to the subscriber's programme selection switch.

We claim:

1. An apparatus arrangement for registering acceptance of signals by a subscriber in a system for conveying television or radio programmes or other information on a subscription basis to each of a plurality of subscribers by way of a common channel, and in which a series of time-spaced reference signals of a particular identifiable form are transmitted over said common channel with the information signals, which apparatus arrangement comprises for each subscriber a cyclically operating timing device including an endless loop of flexible material, driving means for moving said loop in one direction, first switching means operated by said endless loop after movement thereof by said driving means by a predetermined distance from a given datum position of said loop, and signal controlled means for initiating operation of said driving means to move said loop, reference signal detecting means for detecting the arrival of each of said reference signals at the subscriber's apparatus and therefrom deriving a control signal to operate said reference signal controlled means to initiate operation of said driving means, acceptance signal generating means for generating a signal output in response to each energisation of a control input thereto, circuit means coupling said pulse signal output to said common channel for transmission to a common recording point and circuit means including said first switching means to cause operation of said acceptance signal generating means after a predetermined time delay determined by the movement of said endless loop subsequent to receipt of each reference signal, the time delay value provided by said endless loop being different for each of said subscribers whereby the respective time delay values of the receipt of different acceptance signals at said common recording point relative to the timing of each reference signal identify those subscribers who are receiving the offered signals.

2. An arrangement according to claim 1 which includes second switching means operated by said loop to stop the movement of said loop until the arrival of the next following reference signal.

3. An arrangement according to claim 2 in which said second switching means are operated when said loop has completed one complete revolution whereby said loop is returned to its initial datum position before the arrival of the next following reference signal.

4. An arrangement according to claim 2 in which said driving means move said loop at a constant predetermined speed.

5. An arrangement according to claim 4 in which said driving means comprises a synchronous alternating current electric motor.

6. An arrangement according to claim 1 in which said loop operates said first switch means by mechanical movement of an operating member of said switch means.

7. An arrangement according to claim 6 in which said loop is provided with a notch in an edge thereof and in which said first switch means includes an operating member in engagement with said edge of said loop.

8. An arrangement according to claim 5 in which said reference signal controlled means comprise a relay arranged to close a power supply circuit to said motor in response to each received reference signal and in which said second switching means open said power supply circuit upon return of said loop to said datum position.

9. An arrangement according to claim 1 in which a series of time-spaced timing signals of a separately identifiable form distinguishable from said reference signals is transmitted over said channel between each pair of successive reference signals, and in which each subscriber's apparatus comprises timing signal sensing means providing a signal output in response to each received timing signal, a coincidence gate circuit device having one control input supplied with control signals derived from said timing device and a second control input supplied with the signal output derived from said timing signal sensing means, the output of said gate circuit being connected to control the operation of said acceptance signal generating means whereby each acceptance signal caused to be emitted by said timing device is synchronised with one of said timing signals.

10. An arrangement according to claim 1 in which said acceptance signal generating means comprises a pulse signal generator and an oscillator of predetermined operation frequency arranged to modulate each of said pulse signals at said predetermined frequency.

11. An arrangement according to claim 1 in which said endless loop comprises a signal recording material and in which recording head means are provided at a fixed position adjacent said belt.

12. An arrangement according to claim 11 in which said loop comprises at least one longitudinal magnetic recording track thereon and in which an associated magnetic recording head is operative on said track.

13. Apparatus according to claim 1 in which at least some of said subscriber's apparatus arrangements include prepayment mechanism for obtaining monetary payment for said received signals and in which a series of time-spaced charge controlling signals of a separately identifiable form distinguishable from said reference signals is transmitted over said channel, such subscriber's apparatus arrangements each comprising an electric motor, means coupling said motor to said prepayment mechanism to reduce the credit condition thereof, relay means controlling the supply of energising current to said electric motor charge controlling signal sensing means providing a signal output in response to each of said charge controlling signals and circuit means for operating said relay means to control the period of operation of said motor to reduce the credit condition of said prepayment mechanism in accordance witih the payment demanded for supply of said information signals.

References Cited by the Examiner

UNITED STATES PATENTS

| | | | |
|---|---|---|---|
| 2,573,349 | 10/1951 | Miller et al. | 178—5.1 X |
| 2,649,498 | 8/1953 | Ellett | 178—5.1 |
| 2,797,260 | 6/1957 | Roschke | 178—5.1 X |
| 2,918,522 | 12/1959 | Ridenour | 343—228 X |
| 3,058,065 | 10/1962 | Freeman et al. | |
| 3,130,265 | 4/1964 | Leonard | 178—6 |
| 3,161,761 | 12/1964 | Grosser et al. | 340—152 X |
| 3,172,948 | 3/1965 | Rubinstein | 178—5.1 |
| 3,188,384 | 6/1965 | Townsend | 178—5.1 X |
| 3,249,689 | 6/1966 | Davis et al. | 178—5.1 X |
| 3,255,306 | 6/1966 | Campbell et al. | 178—5.1 X |

NEIL C. READ, *Primary Examiner.*

D. YUSKO, *Assistant Examiner.*